(12) United States Patent
Hsu et al.

(10) Patent No.: US 7,445,361 B1
(45) Date of Patent: Nov. 4, 2008

(54) PRISM SHEET AND BACKLIGHT MODULE USING THE SAME

(75) Inventors: Tung-Ming Hsu, Taipei Hsien (TW); Shao-Han Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/949,060

(22) Filed: Dec. 3, 2007

(30) Foreign Application Priority Data

Sep. 21, 2007 (CN) .................... 2007 1 0201810

(51) Int. Cl.
*F21V 5/02* (2006.01)

(52) U.S. Cl. .................. 362/333; 362/330; 362/339; 362/309; 362/223; 362/240; 362/246; 362/323

(58) Field of Classification Search .............. 362/326, 362/330, 333, 339, 307, 308, 309, 222, 223, 362/240, 244, 246, 620, 626
See application file for complete search history.

(56) References Cited

U.S. PATENT DOCUMENTS

| 3,721,818 | A  | * | 3/1973  | Stahlhut ..................... 362/297 |
| 7,121,709 | B2 | * | 10/2006 | Shinohara et al. ........... 362/606 |
| 2007/0171671 | A1 | * | 7/2007  | Kurokawa et al. .......... 362/606 |

* cited by examiner

*Primary Examiner*—Laura Tso
(74) *Attorney, Agent, or Firm*—Frank R. Niranjan

(57) ABSTRACT

An exemplary prism sheet includes a transparent main body. The main body includes a first surface, a second surface opposite to the first surface, a plurality of elongated waved protrusions formed in the first surface, and a plurality of micro-depressions formed in the second surface. Each of micro-depressions has four connecting sidewalls. A transverse width of each sidewall progressively decreases with increasing distance from a bottom surface that is coplanar with the second surface. A backlight module using the present prism sheet is also provided.

17 Claims, 9 Drawing Sheets

PRISM SHEET AND BACKLIGHT MODULE USING THE SAME

CROSS-REFERENCE TO RELATED APPLICATIONS

This application is related to seven co-pending U.S. patent applications, which are: application Ser. No. 11/938,307 and Ser. No. 11/938,308, filed on Nov. 12, 2007, and both entitled "PRISM SHEET AND BACKLIGHT MODULE USING THE SAME"; application Ser. No. 11/940,328, filed on Nov. 15, 2007, and entitled "PRISM SHEET AND BACKLIGHT MODULE USING THE SAME", application Ser. No. 11/946,866 and Ser. No. 11/946,867, filed on Nov. 12, 2007, and both entitled "PRISM SHEET AND BACKLIGHT MODULE USING THE SAME", and application serial no. [to be determined], with Ser. No. 11/949,258 and Ser. No. 11/949/059, and both entitled "PRISM SHEET AND BACKLIGHT MODULE USING THE SAME". In the co-pending application, the inventors are Tung-Ming Hsu and Shao-Han Chang. The co-pending application has the same assignee as the present application. The disclosure of the above identified application is incorporated herein by reference.

BACKGROUND OF THE INVENTION

1. Field of the Invention

The present invention relates to prisms, and particularly, to a prism sheet used in a backlight module.

2. Discussion of the Related Art

In a liquid crystal display device (LCD device), liquid crystal is a substance that does not itself illuminate light. Instead, the liquid crystal relies on light received from a light source to display information. In the case of a typical liquid crystal display device, a backlight module powered by electricity supplies the needed light.

FIG. 7 depicts a typical direct type backlight module 100. The backlight module 100 includes a housing 11, a plurality of lamps 12 above a base of the housing 11 for emitting light, and a light diffusion plate 13 and a prism sheet 10 stacked on top of the housing 11 in that order. An interior of the housing 11 is configured for reflecting light upwards. The light diffusion plate 13 includes a plurality of dispersion particles (not shown) therein. The dispersion particles are configured for scattering light, thus enhancing the uniformity of light exiting the light diffusion plate 13.

Referring to FIG. 8, the prism sheet 10 includes a base layer 101 and a prism layer 102 formed on the base layer 101. The prism layer 102 contains a plurality of parallel prism lenses 103 having a triangular cross-section. The prism lenses 103 are configured for collimating light to a certain extent. Typically, a method of manufacturing the prism sheet 10 includes the following steps: first, a melted ultraviolet—cured transparent resin is coated on the base layer 101 to form V-shaped lenses, then the melted ultraviolet-cured transparent resin is solidified to form the prism lenses 103.

In use, unscattered light from the lamps 12 enters the light diffusion plate 13 and becomes scattered. The scattered light leaves the light diffusion plate 13 and enters the prism sheet 10. The scattered light then travels through the prism sheet 10 before refracted out at the prism lenses 103 of the prism layer 102. Thus, the refracted light leaving the prism sheet 10 is concentrated at the prism layer 102 and increases the brightness of the backlight module 100. The refracted light then propagates into an LCD panel (not shown) disposed above the prism sheet 10.

When the light is scattered in the light diffusion plate 13, the scattered light enters the prism sheet at different angles of incidence. Referring to FIG. 9, when scattered light enters the prism sheet 10 at different angles of incidence, the scattered light generally travels through the prism sheet 10 along three light paths. In the first light path (such as $a_1$, $a_2$) the light enters the prism sheet at small angles of incidence and refracts out of the prism lenses with the refracted path closer to the normal to the surface of the base layer 101. In the second light path (such as $a_3$, $a_4$) the light enters the prism sheet 10 at angles of incidence larger than the first light path and refracts out of the prism lenses 103 with the refracted path being closer to the normal to the surface of the prism lenses 103. Both the first light path and the second light path contribute to the brightness of the LED and the light utilization efficiency of the backlight module 100. However, in the case of the third light path (such as $a_5$, $a_6$), the light enters the prism sheets at angles greater than the second light path, such that when the refracted light in the third light path leaves the prism sheet 10 at the prism lenses 103 the refracted light impinges on the surface of adjacent prism lens 103 and reenters the prism sheet 10. Thus, light traveling along the third light path will eventually reenter the prism sheet 10 and may exit the prism sheet 10 on the same side the light entered. This third light path does not contribute to the light utilization efficiency of the backlight module 100. Further, the third light path may interfere with or inhibit other incident light resulting in decreasing brightness of the backlight module 100.

What is needed, therefore, is a new prism sheet and a backlight module using the prism sheet that can overcome the above-mentioned shortcomings.

SUMMARY

In one aspect, a prism sheet according to a preferred embodiment includes a transparent main body. The main body includes a first surface, a second surface opposite to the first surface, a plurality of elongated waved protrusions formed in the first surface, and a plurality of micro-depressions formed in the second surface. Each of micro-depressions has four connecting sidewalls. A transverse width of each sidewall progressively decreases with increasing distance from a bottom surface that is coplanar with the second surface.

In another aspect, a backlight module according to a preferred embodiment includes a plurality of lamps, a light diffusion plate and a prism sheet. The light diffusion plate is disposed above the lamps and the prism sheet is stacked on the light diffusion plate. The prism sheet is same as described in a previous paragraph.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present prism sheet and backlight module. Moreover, in the drawings, like reference numerals designate corresponding parts throughout several views, and all the views are schematic.

DETAILED DESCRIPTION OF THE PREFERRED EMBODIMENTS

Reference will now be made to the drawings to describe preferred embodiments of the present prism sheet and backlight module, in detail.

Figure 1:
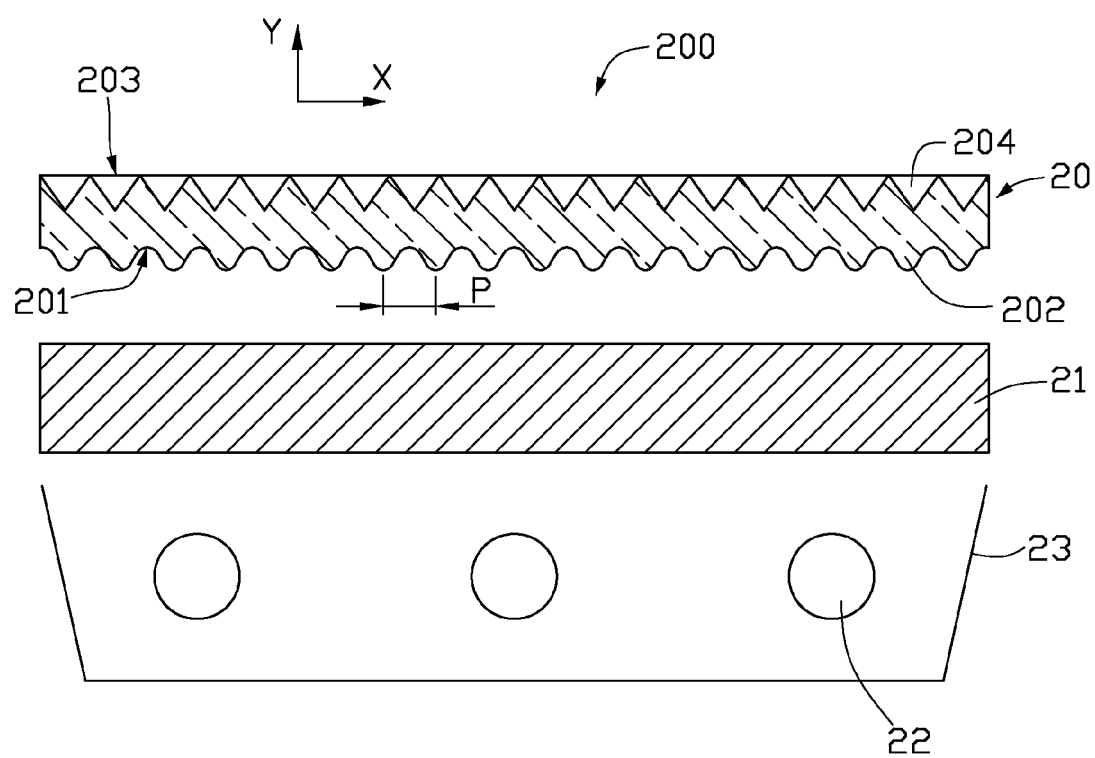
FIG. 1 is a side, cross-sectional view of a backlight module using a prism sheet according to a first preferred embodiment of the present invention.

Referring to FIG. 1, a backlight module 200 in accordance with a first preferred embodiment of the present invention is shown. The backlight module 200 includes a prism sheet 20, a light diffusion plate 21, a plurality of lamps 22, and a housing 23. The lamps 22 are regularly aligned above a base of the housing 23. The light diffusion plate 21 and the prism sheet 20 are stacked on the top of the housing 23 in that order.

Figure 2:
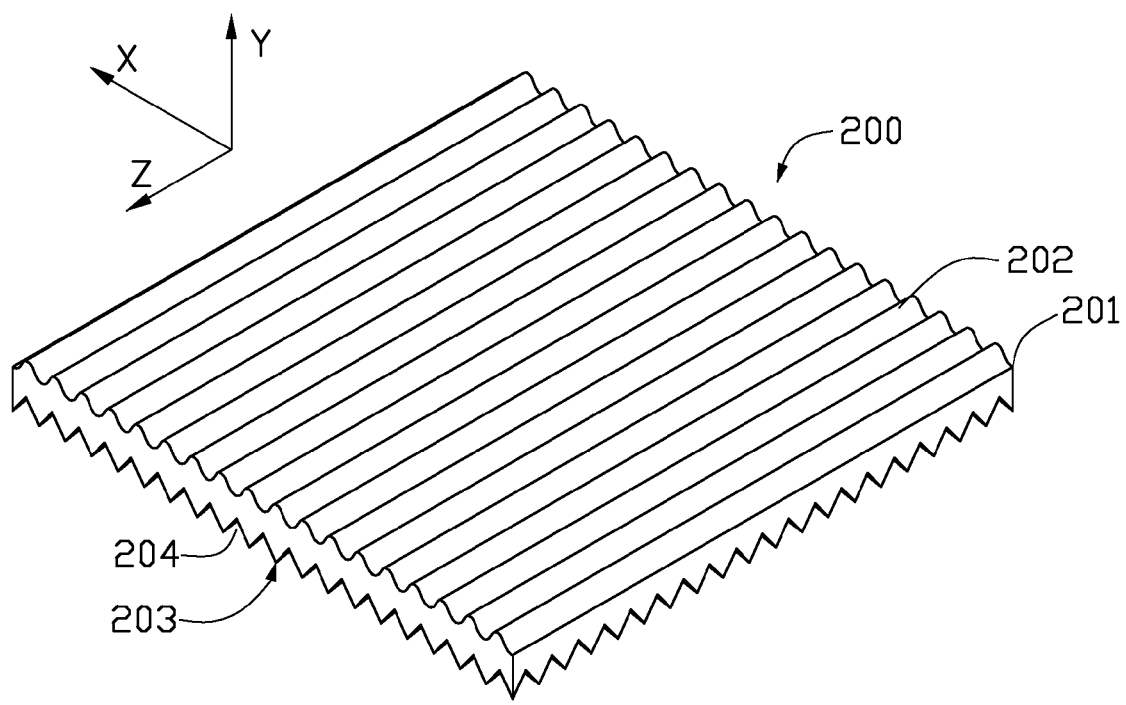
FIG. 2 is an isometric view of the prism sheet of FIG. 1.
Figure 3:
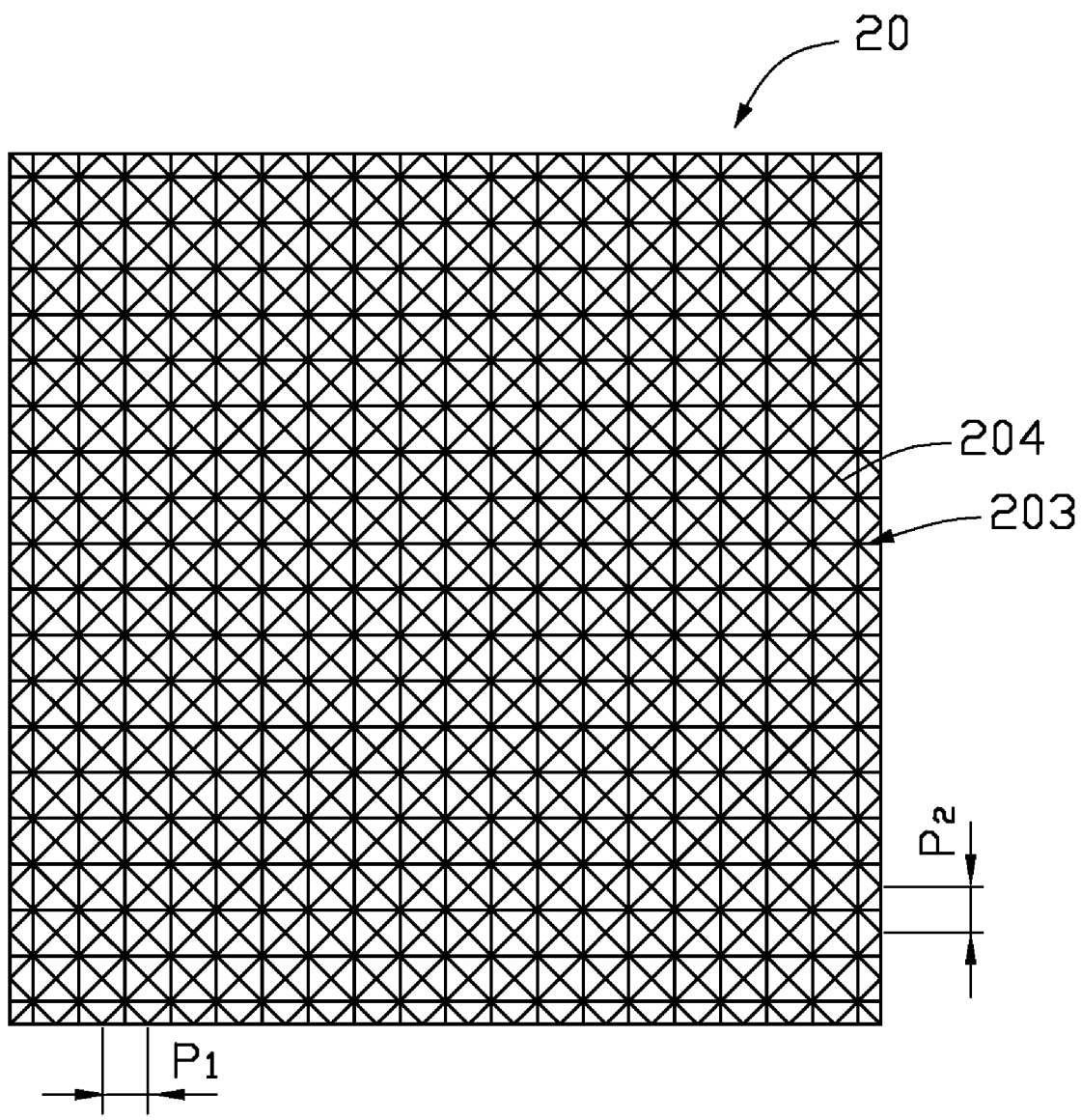
FIG. 3 is a top plan view of the prism sheet of FIG. 1.

Referring to FIGS. 2 and 3, the prism sheet 20 includes a transparent main body. The main body includes a first surface 201, a second surface 203. Furthermore, first surface 201 and the second surface 203 define a plurality of spherical depressions 202 and micro-depressions 204 respectively. The first surface 201 and the second surface 203 are on opposite sides of the main body. The prism sheet 20 is stacked on the light diffusion plate 21 such that the first surface 201 is adjacent to the light diffusion plate 23, and the second surface 203 faces away from the light diffusion plate 23.

The elongated waved protrusions 202 are distributed on the first surface 201 parallel to each other. The elongated waved protrusions 202 are configured for enabling the first surface 201 to converge incident light from the lamps 22 to a certain extent (hereafter first light convergence). The elongated waved protrusions 202 extend along a straight line between a pair of opposite side surfaces of the prism sheet 20 in a Y-direction. A pitch $P_1$ between adjacent longitudinal center lines of the elongated waved protrusions 202 can be configured to be in a range from about 0.025 millimeters to about 1.5 millimeters. In the first embodiment, the elongated waved protrusions 202 are V-shaped protrusion whose top edges or bottom edges defined by the boundary formed by bases of two adjacent V-shaped protrusions are rounded.

The micro-depressions 204 are distributed on the second surface 203 in a matrix manner. The micro-depressions 204 are configured for enabling the second surface layer 203 to converge light exiting the second surface 203 (hereafter second light convergence). Each micro-depression 204 has a shape like an inverted prism and forms four triangular sidewalls connected with each other. A transverse width of each of the triangular sidewalls progressively decreases with increasing distance from the second surface 203. In the first preferred embodiment, each micro-depression 204 is a square pyramidal depression formed by four triangular sidewalls. The triangular sidewalls are isosceles triangles. Rows and columns of the micro-depression 204 in the matrix are parallel to the edges of the prism sheet 20 (along an X-direction and a Y-direction) correspondingly. Pitches $P_1$ and $P_2$ between adjacent micro-depression 204 along the X-direction and the Y-direction correspondingly are configured to be in the range from about 0.025 millimeters to about 1 millimeter. A dihedral angle $\theta_1$, defined between sidewalls on opposite sides of each micro-depression 204, is configured to be in the range from about 60 degrees to about 120 degrees. In alternative embodiments, the rows or the columns of the micro-depressions 204 are aligned obliquely corresponding to the edges of the prism sheet 20, thus having other alignments or orientations.

A thickness of the prism sheet 20 is preferably in the range from about 0.5 millimeters to about 3 millimeters. The prism sheet 20 can be made of transparent material selected from the group consisting of polycarbonate (PC), polymethyl methacrylate (PMMA), polystyrene (PS), copolymer of methylmethacrylate and styrene (MS), and any suitable combination thereof.

Referring to FIG. 1 again, the lamps 22 can be point light sources such as light emitting diodes, or linear light sources such as cold cathode fluorescent lamps. The housing 23 is made of metal or plastic materials with a high reflectivity rate. Alternatively, an interior of the housing 23 is preferably deposited with a high reflectivity coating for improving the light reflectivity rate of the housing 23. In this embodiment, the lamps 22 are cold cathode fluorescent lamps. The housing 23 is made of high reflective metal having a high reflective surface.

In the backlight module 200, when light enters the prism sheet 20 via the first surface 201, the light undergoes the first light convergence at the first surface 201. Then the light further undergoes the second light convergence at the second surface 203 before exiting the prism sheet 20. Thus, a brightness of the backlight module 200 is increased. In addition, due to the micro-depressions 204, the light exiting the prism sheet 20 would mostly propagate along directions close to the Y-direction. At the same time, less light would travel along directions close to the X-direction, minimizing the light energy loss. Thus, the light energy utilization rate of the backlight module 200 is high.

Furthermore, because the first surface 201 forms protrusions having curved surfaces, a light receiving area of the sheet is increased. The second surface 203 forms depressions having sidewalls expanding out of the prism sheet 20 at an angle, thus, the angle that the light refracts out (allowing the light to exit) of the prism sheet 20 is expanded. Additionally, the slope of the sidewalls of micro-depressions 204 and also the obliqueness relative to the edge of the prism sheet 20 can have various configurations according to predetermined viewing angles requirements of the backlight module 200. The prism sheet 20 can also be orientated to obtain appropriate viewing angle thereby satisfying most of the LCD displays' requirements on horizontal and vertical viewing angles.

Moreover, in comparison to the conventional prism sheet, the prism sheet 20 of the present invention is integrally formed by injection molding technology. Injection molding allows the prism sheet 20 to be easier to mass-produce than the conventional method. Furthermore, because the prism lenses of the conventional prism sheet are formed by solidifying melted ultraviolet-cured transparent resin, the prism lenses of the conventional prism sheet are easily damaged and/or scratched due to poor rigidity and mechanical strength of the prism lenses. The prism sheet 20 of the present invention has better rigidity and mechanical strength than the conventional prism sheet. Therefore, the present prism sheet is not damaged or scratched.

Figure 4:
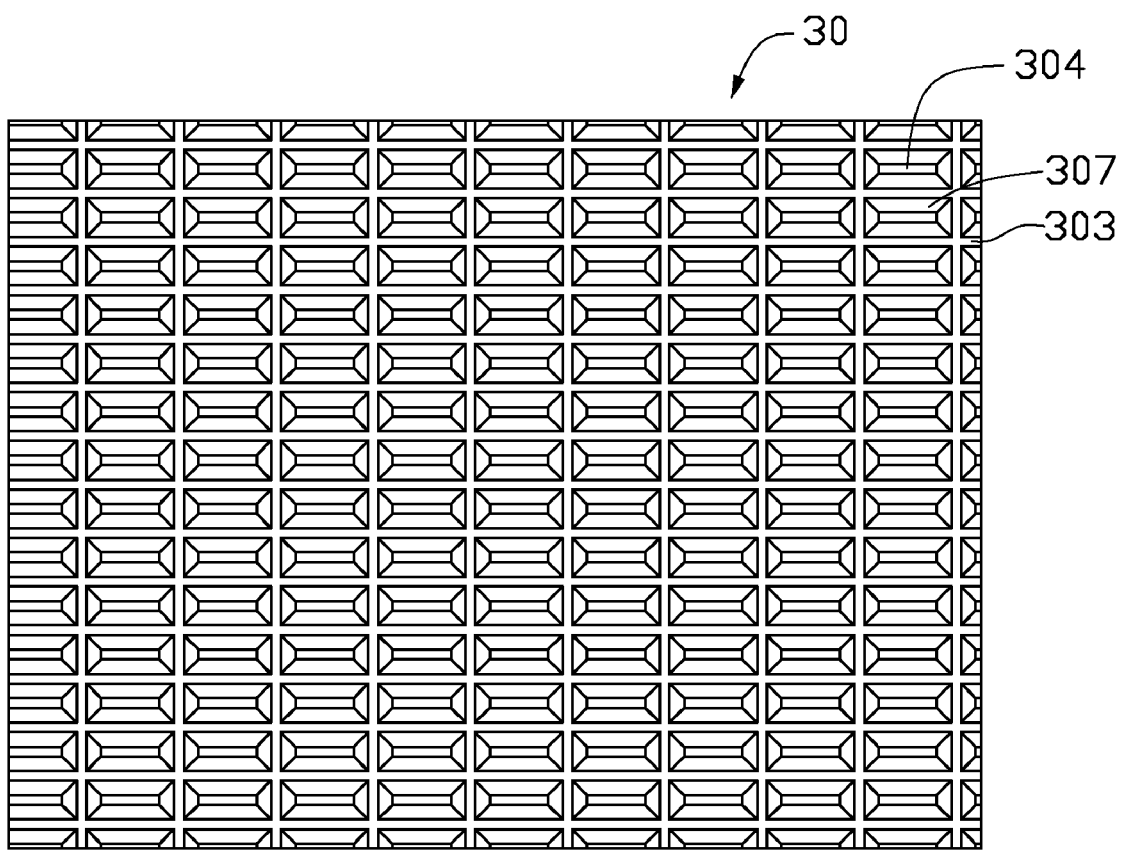
FIG. 4 is a top plan view of a prism sheet according to a second preferred embodiment of the present invention.

Referring to FIG. 4, a prism sheet 30 in accordance with a second preferred embodiment of the present invention is shown. The prism sheet 30 is similar in principle to the prism sheet 20. However, micro-depressions 304 are aligned apart on second surface 303 of the prism sheet 30 in a matrix arrangement, and each of the micro-depressions 304 is a frusto-pyramidal depression and formed by four sidewalls 307. Each of the sidewalls 307 of the micro-depressions 304 is an isosceles trapezium.

Figure 5:
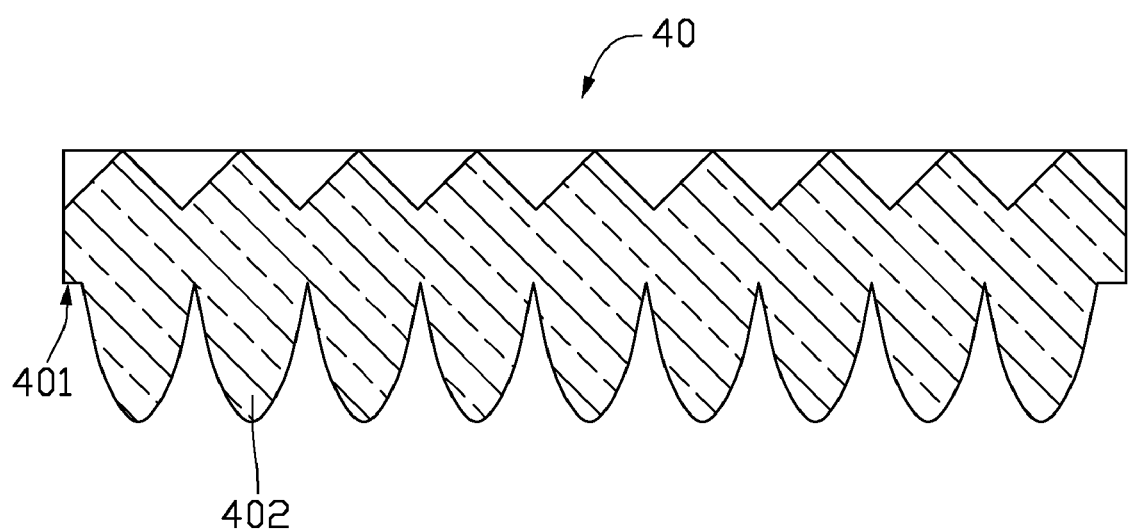
FIG. 5 is a side, cross-sectional view of a prism sheet according to a third preferred embodiment of the present invention.

Referring to FIG. 5, a prism sheet 40 in accordance with a third preferred embodiment of the present invention is shown. The prism sheet 40 is similar in principle to the prism sheet 20. However, a profile of vertical cross-section of each elongated waved protrusion 402 on a first surface 401 is a portion of parabola.

Figure 6:
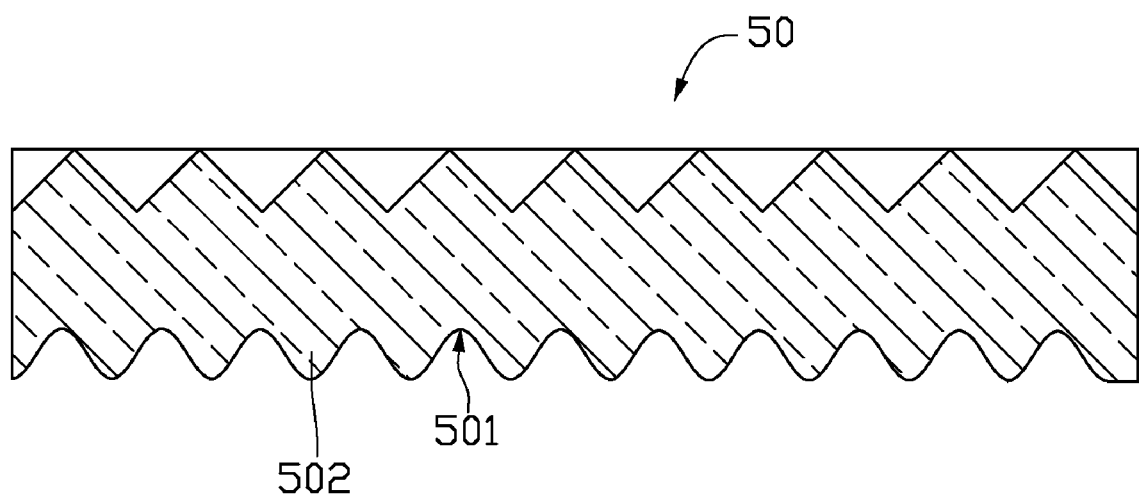
FIG. 6 is a side, cross-sectional of a prism sheet according to a third preferred embodiment of the present invention.
Figure 7:
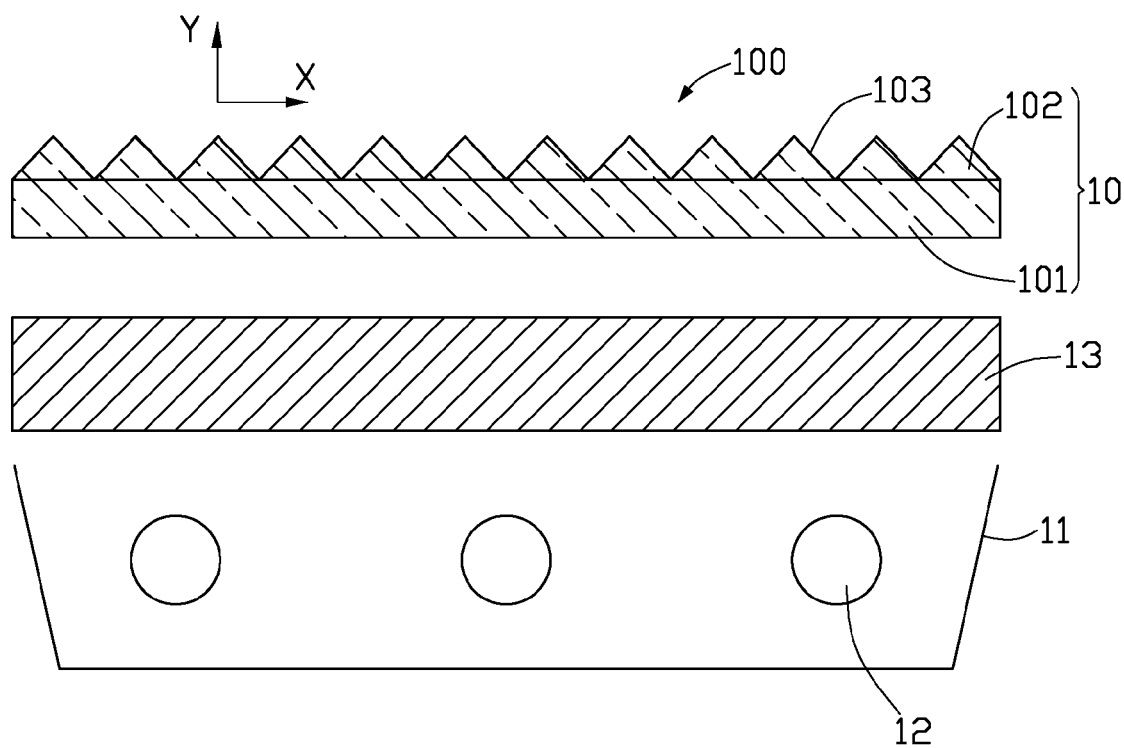
FIG. 7 is a side, cross-sectional view of a conventional backlight module employing a typical prism sheet.
Figure 8:
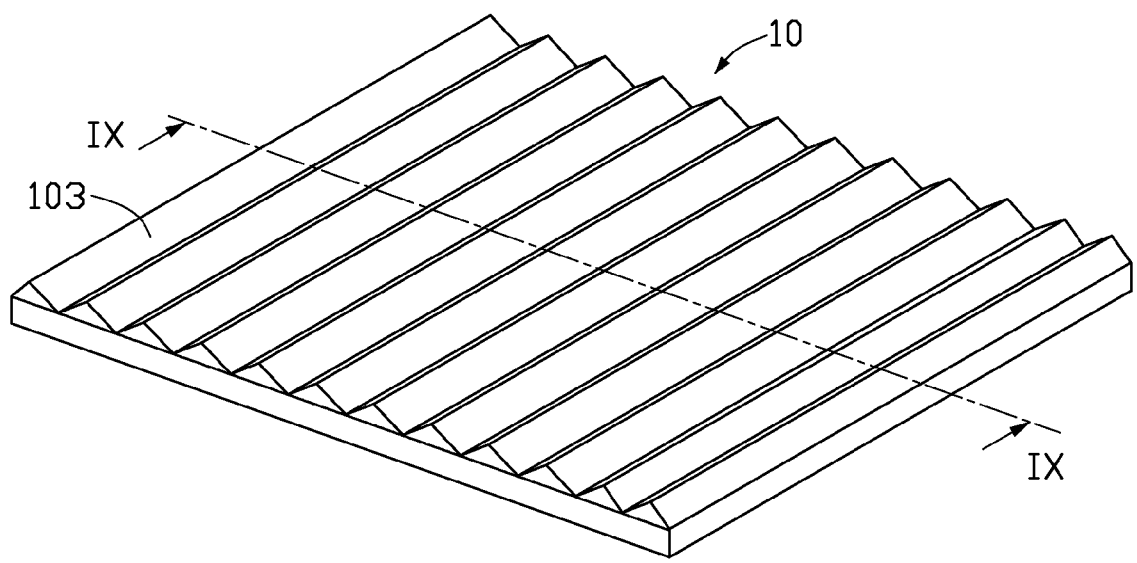
FIG. 8 is an isometric view of the prism sheet shown in FIG. 7.
Figure 9:
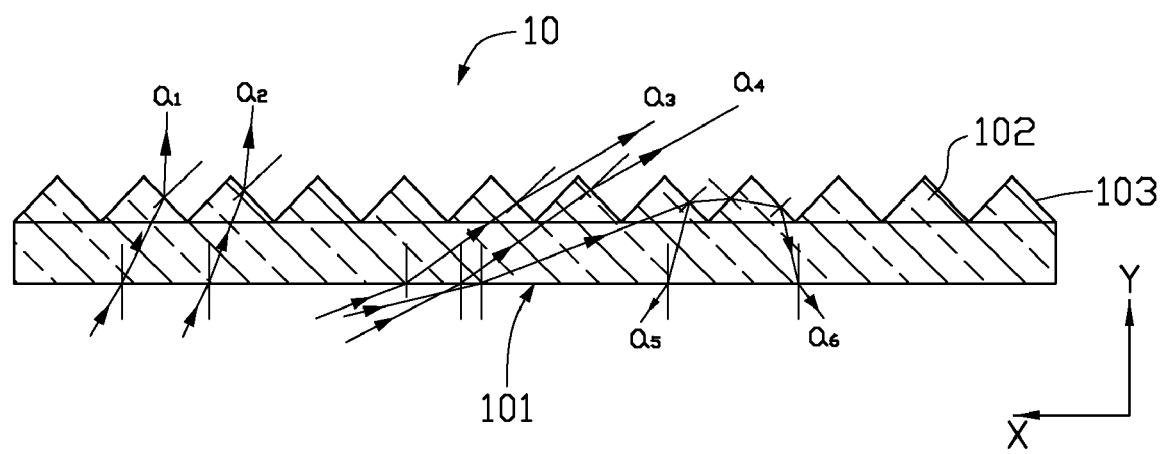
FIG. 9 is a side, cross-sectional view of the prism sheet of FIG. 8, taken along line IX-IX, showing light transmission paths.

Referring to FIG. 6, a prism sheet 50 in accordance with a third preferred embodiment of the present invention is shown. The prism sheet 50 is similar in principle to the prism sheet 20. However, a profile of vertical cross-section of each elongated waved protrusion 502 on a first surface 501 is a portion of sinusoid.

Finally, while various embodiments have been described and illustrated, the invention is not to be construed as being limited thereto. Various modifications can be made to the embodiments by those skilled in the art without departing from the true spirit and scope of the invention as defined by the appended claims.

What is claimed is:

1. A prism sheet comprising:
a transparent main body having:
a first surface,
a second surface opposite to the first surface,
a plurality of elongated waved protrusions formed in the first surface; and
a plurality of micro-depressions formed in the second surface, each of micro-depressions having four connecting sidewalls, a transverse width of each sidewall progressively decreasing with increasing distance from a bottom surface that is coplanar with the second surface.

2. The prism sheet according to claim 1, wherein a pitch between adjacent elongated waved protrusions is in a range from about 0.025 millimeters to about 1.5 millimeters.

3. The prism sheet according to claim 1, wherein a profile of vertical cross-section of each elongated waved protrusion is a portion of parabola or sinusoid.

4. The prism sheet according to claim 1, wherein the micro-depressions are selected from a group consisting of rectangular pyramidal depression and frusto-pyramidal depression.

5. The prism sheet according to claim 1, wherein a dihedral angle defined between two opposite sidewalls of each of the micro-depressions is configured to be in a range from about 60 degrees to about 120 degrees.

6. The prism sheet according to claim 1, wherein a pitch between adjacent micro-depressions is configured to be in a range from about 0.025 millimeters to about 1 millimeter.

7. The prism sheet according to claim 1, wherein a thickness of the prism sheet is in a range from about 0.5 millimeters to about 3 millimeters.

8. The prism sheet according to claim 1, wherein the prism sheet is made of transparent material selected from the group consisting of polycarbonate, polymethyl methacrylate, polystyrene, copolymer of methylmethacrylate and styrene, and any combination thereof.

9. A backlight module comprising:
a plurality of lamps;
a light diffusion plate disposed above the lamps; and
a prism sheet disposed on the light diffusion plate, the prism sheet includes a transparent main body having
a first surface,
a second surface opposite to the first surface, and
a plurality of elongated waved protrusions formed in the first surface; and
a plurality of micro-depressions formed in the second surface, each of micro-depressions having four connecting sidewalls, a transverse width of each sidewall progressively decreasing with increasing distance from a bottom surface that is coplanar with the second surface.

10. The backlight module according to claim 9, wherein the first surface of the prism sheet faces the light diffusion plate.

11. The backlight module according to claim 9, wherein a pitch between adjacent elongated waved protrusions is in a range from about 0.025 millimeters to about 1.5 millimeters.

12. The backlight module according to claim 9, wherein a profile of vertical cross-section of each elongated waved protrusion is a portion of parabola or sinusoid.

13. The backlight module according to claim 9, wherein the micro-depressions are selected from a group consisting of rectangular pyramidal depression and frusto-pyramidal depression.

14. The backlight module according to claim 9, wherein a dihedral angle defined between two opposite sidewalls of each of the micro-depressions is configured to be in a range from about 60 degrees to about 120 degrees.

15. The backlight module according to claim 9, wherein a pitch between adjacent micro-depressions is configured to be in a range from about 0.025 millimeters to about 1 millimeter.

16. The backlight module according to claim 9, wherein a thickness of the prism sheet is in a range from about 0.5 millimeters to about 3 millimeters.

17. The backlight module according to claim 9, wherein the prism sheet is made of transparent material selected from the group consisting of polycarbonate, polymethyl methacrylate, polystyrene, copolymer of methylmethacrylate and styrene, and any combination thereof.

* * * * *